(12) United States Patent
Melville et al.

(10) Patent No.: US 8,053,549 B2
(45) Date of Patent: Nov. 8, 2011

(54) METHOD FOR THE PREPARATION OF FLUOROPOLYMER POWDERED MATERIALS

(75) Inventors: Andrew J. Melville, Cheshire (GB); Leonard W. Harvey, Downingtown, PA (US); Joel Ginies, Cheshire (GB); Michael Coates, Elverson, PA (US); Julie K. Wright, Cheshire (GB)

(73) Assignee: Whitford Plastics Limited, Runcorn, Cheshire (GB)

( * ) Notice: Subject to any disclaimer, the term of this patent is extended or adjusted under 35 U.S.C. 154(b) by 0 days.

(21) Appl. No.: 12/669,389

(22) PCT Filed: Jul. 15, 2008

(86) PCT No.: PCT/GB2008/002415
§ 371 (c)(1),
(2), (4) Date: Mar. 17, 2010

(87) PCT Pub. No.: WO2009/010740
PCT Pub. Date: Jan. 22, 2009

(65) Prior Publication Data
US 2010/0204440 A1  Aug. 12, 2010

(30) Foreign Application Priority Data
Jul. 17, 2007 (GB) .................................. 0713891.0

(51) Int. Cl.
*C08G 6/00* (2006.01)
*C08J 3/00* (2006.01)

(52) U.S. Cl. .................. 528/481; 427/385.5; 524/501; 525/199

(58) Field of Classification Search ............... 427/385.5; 524/501; 525/199; 528/481
See application file for complete search history.

(56) References Cited

U.S. PATENT DOCUMENTS

| | | | |
|---|---|---|---|
| 3,692,759 A * | 9/1972 | Ocone | 528/481 |
| 3,803,108 A | 4/1974 | Ocone | |
| 4,520,170 A | 5/1985 | Kitto | |
| 6,355,391 B1 | 3/2002 | Van Dusen et al. | |
| 6,528,574 B1 | 3/2003 | Levy et al. | |

FOREIGN PATENT DOCUMENTS

| | | |
|---|---|---|
| EP | 1746130 A1 | 1/2007 |
| GB | 1327159 A | 8/1973 |
| JP | 8-185865 A | 7/1996 |
| WO | WO2004/108842 A1 | 12/2004 |
| WO | WO2007/080426 A1 | 7/2007 |

OTHER PUBLICATIONS

International Search Report and Written Opinion from parent application No. PCT/GB2008/002415.
British Search Report mailed Sep. 19, 2007 in priority application No. GB0713891.0.
European Examination report issued Jun. 11, 2010 in European Application No. 08775953.6-2115.
Applicant's response to the Examination Report dated Jun. 11, 2010 filed on Oct. 15, 2010 in European Application No. 08775953.6.
European Examination report issued May 31, 2011 in European Application No. 08775953.6.

* cited by examiner

*Primary Examiner* — Terressa Boykin
(74) *Attorney, Agent, or Firm* — Baker & Daniels LLP

(57) ABSTRACT

A method for the preparation of a modified fluoropolymer powdered material is disclosed. A suspension of solid fluoropolymer particles together with PTFE particles in an aqueous carrier, is frozen and the frozen carrier is then removed by sublimation at sub-atmospheric pressure to produce a dry powder of modified fluoropolymer particles.

19 Claims, 3 Drawing Sheets

METHOD FOR THE PREPARATION OF FLUOROPOLYMER POWDERED MATERIALS

CROSS-REFERENCE TO RELATED APPLICATIONS

Figure 1:
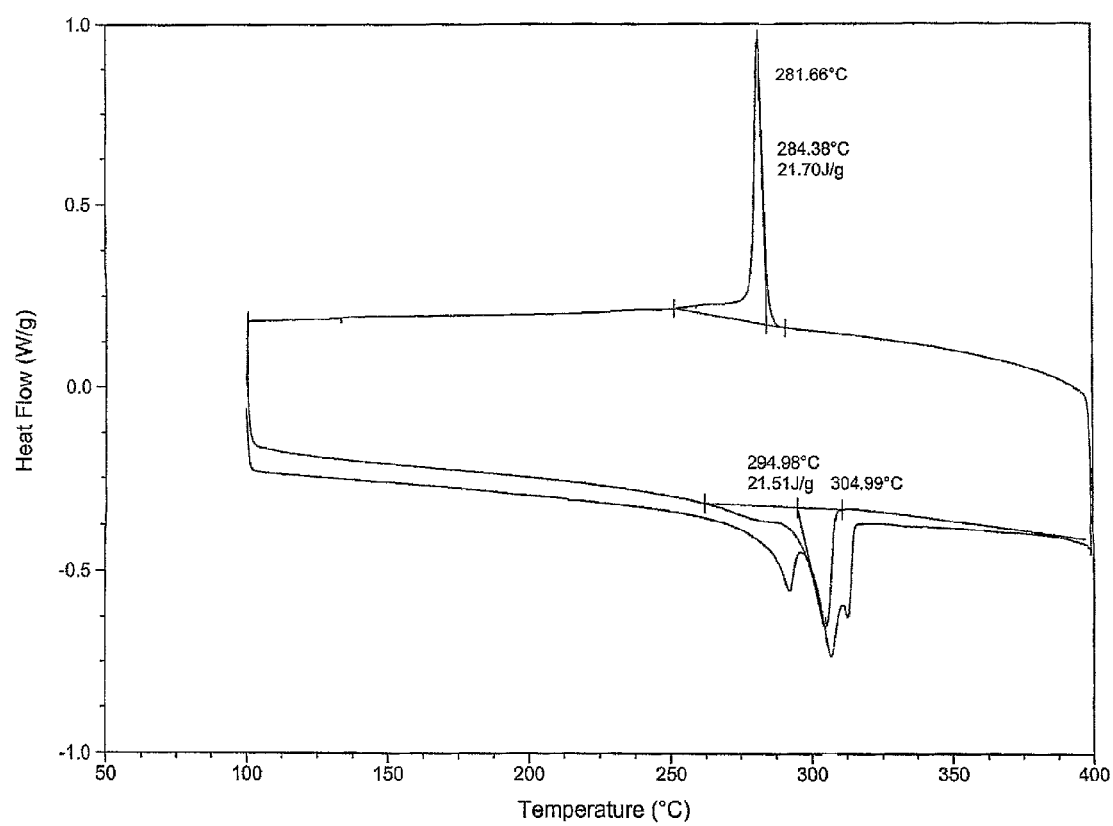

This application is a U.S. National Phase patent application based on International Application Serial No. PCT/GB2008/002415 filed Jul. 15, 2008, the disclosure of which is hereby explicitly incorporated by reference herein.

The present invention relates to a method for the preparation of Fluoropolymer powdered materials.

Fluoropolymers are long-chain polymers comprising mainly ethylenic linear repeating units in which some or all of the hydrogen atoms are replaced with fluorine. Examples include Poly (tetrafluoroethylene), Perfluoromethyl vinyl ether (MFA), Fluoro ethylene propylene (FEP), Per Fluoro Alkoxy (PFA), Poly(chlorotrifluoroethylene) and Poly(vinylfluoride). They are amongst the most chemically inert of all polymers and are characterised by an unusual resistance to acids, bases and solvents. They have unusually low frictional properties and have the ability to withstand extremes of temperature. Accordingly, fluoropolymers are utilised in a wide variety of applications in which resistance to extreme environments is necessary. Current applications include the formation of tubing and packing materials within chemical plants, semiconductor equipment, automotive parts and structural cladding.

There are several applications which require the powdered form of the fluoropolymer. The fluoropolymer may be applied to a surface by electrostatic spraying of the powder. Uses would include the coating of household cookware to increase non-stick properties and abrasion resistance, and the coating of automotive parts to increase resistance to environmental weathering.

At present, two methods are generally used to produce the powdered form of a fluoropolymer. Spray drying methods comprise the pumping of an aqueous dispersion of the fluoropolymer feed into an atomising system, generally located at the top of a drying chamber. The liquid is atomised into a stream of heated gas to evaporate the water and produce a dry powder. This method has several limitations. The requirement that the aqueous dispersion is pumped into the atomising system limits the use of this process to pumpable materials, and the spray dried agglomerates are tightly bound to each other and resist subsequent disagglomeration. In addition, only non-fibrillatable materials can be processed, as atomisation may result in the fibrillation of the fluoropolymer, resulting in an intractable 'marshmallow' material which is difficult to handle.

An alternative method involves the coagulation of the particles within an aqueous dispersion. Coagulation is facilitated by the use of high mechanical shear, the addition of acids or the addition of gelling agents and subsequent treatment with a water immiscible organic liquid. The coagulated particles can be separated from the residual liquid by filtration and subsequently dried, typically using tray, belt or flash dryers. The coagulated granules are usually case hardened for ease of handling. However, the formation of agglomerates results in a particle size that is too large for use in conventional powder spray application techniques. Milling, traditionally used to adjust the particle size distribution, can cause fibrillation of the particles, to produce an intractable material which is difficult to handle. The case hardened material also produces a tight agglomerate which resists subsequent disagglomeration.

In both these methods, it is difficult to incorporate any significant amount of a modifier to improve the barrier properties of the fluoropolymer.

It is therefore an object of the present invention to provide a method for the preparation of a modified fluoropolymer powdered material with improved barrier properties.

According to the present invention there is provided a method for the preparation of a modified fluoropolymer material in powder form which comprises the steps of: forming a suspension of solid particles of the fluoropolymer together with particles of polytetrafluoroethylene (PTFE) as a modifier in an aqueous liquid carrier; freezing the aqueous suspension; and subsequently subjecting the frozen aqueous suspension to sublimation, thereby producing dry particles of the fluoropolymer, modified by the presence of the PTFE modifier, in powder form.

The method of the invention allows more modifier to be added to the polymer than is possible using conventional techniques.

The modifier particles disperse efficiently between the fluoropolymer particles in the aqueous carrier thus imparting superior barrier properties to the finished powder material. A PTFE/fluoropolymer alloy is produced which is more crystalline in nature than the un-modified fluoropolymer. Post milling or irradiation of the freeze-dried modified fluoropolymer material can also enhance its suitability as a powder coating material.

Preferably, the fluoropolymer is perfluoromethyl vinyl ether (MFA). Preferably the particle size of the fluoropolymer is in the range 30 to 350 nm, preferably 200 to 250 nm e.g. about 230 nm. Preferably, the PTFE modifier has a particle size in the range 30 to 350 nm, preferably 200 to 250 nm, and is present as up to 50 wt %, preferably 20 to 30 wt % e.g. about 25 wt % of the MFA/PTFE mixture, expressed on a dry weight basis.

The method is particularly suitable for the processing of Perfluoromethyl vinyl ether (MFA), Fluoro ethylene propylene (FEP) and Per Fluoro Alkoxy (PFA).

Preferably, the modified fluoropolymer powdered material has a particle size that is sufficiently small to allow application by conventional powder spray application techniques. The agglomerates (with a primary particle size of about 0.2 µm) produced may have an average diameter of from 1 to 100 µm, more preferably from 20 to 30 µm.

Preferably, the suspension of the solid fluoropolymer particles in the liquid carrier is frozen in a freezer at a temperature below 0° C. More preferably, the suspension is frozen at a temperature in the range −60° C. to −20° C. Typically, freezing might be completed in 6 hrs to 24 hrs.

Preferably, the suspension of the solid fluoropolymer particles in the liquid carrier is poured, scooped or otherwise transferred into a tray prior to freezing. Preferably, the tray containing the suspension of the solid fluoropolymer particles is then placed into the freezer and frozen within the tray.

Preferably, the aqueous carrier is water with or without surfactant and with or without bridging solvents (organic solvent used to aid the dispersion/solvating of additional resins). If bridging solvents are used, they should be at concentrations low enough and have high enough melting points so that freezing is not inhibited.

Preferably, the sublimation is carried out using sub-atmospheric pressure or a vacuum. The use of a reduced pressure causes sublimation of the carrier from a frozen state directly to a gaseous state, avoiding the solid to liquid and liquid to gas transition. Preferably, the reduced pressure is created by means of a vacuum pump. Preferably, the reduced pressure is in the range 0.01 atm to 0.99 atm, more preferably 0.04 atm to 0.08 atm. Typically, sublimation might be completed in 12 hrs to 48 hrs.

The method is preferably carried out at a temperature which is in practice below the glass transition temperature of the fluoropolymer. The glass transition temperature, $T_g$, of a polymer is the temperature at which it changes from a glassy form to a rubbery form. The measured value of $T_g$ will depend on the molecular weight of the polymer, its thermal history and age, and on the rate of heating and cooling. Typical values are MFA about 75° C., PFA about 75° C., FEP about −208° C., PVDF about −45° C.

The temperature is controlled to assist the sublimation process and avoid melting of the carrier liquid. It is a beneficial coincidence that these controls also maintain temperatures below the Tg values for some of the materials listed. Thus, the method may be carried out at ambient temperature. Alternatively, the method may be carried out at a temperature above ambient temperature, in order to reduce the time taken to complete the process.

The modified fluoropolymer particles may be treated after sublimation has occurred or at any point during the process of the present invention. Such modifications may include, milling or irradiation of the fluoropolymer. Irradiation of the fluoropolymer would generally be carried out after milling to assist in particle size control. Milling adjusts the particle size distribution of the modified fluoropolymer, for example reducing the mean particle size to produce a finer powder. Typically the milling would be carried out conventionally in a pin or jet mill.

Where the method additionally comprises irradiation of the modified fluoropolymer particles, this would typically be carried out on the powder, but alternatively on the suspension. Irradiation adjusts the melt characteristics of the modified fluoropolymer, for example to lower the melting temperatures/glass transition temperatures and increase the melt flow rate.

The method of the present invention does not result in the tight agglomeration of the particles, but instead produces a fine powder, which is suitable for use in extrusion, conventional powder spray application techniques or for redispersion in aqueous or organic media. The friable powder can be broken down easily for particle size modification.

The method of the invention may be carried out at a temperature below the glass transition temperature of the fluoropolymer, in contrast to the known processes involving spray drying and coagulation, which require temperatures well in excess of 100° C. The use of ambient temperature allows greater energy efficiency, while the use of temperatures that are above ambient temperature, but below the glass transition temperature, can be used to increase the speed with which the sublimation proceeds. Temperatures above ambient can also be used to assist secondary drying, to drive off any remaining liquid carrier traces.

The method of the invention can be used to prepare a modified fluoropolymer powdered material whether the fluoropolymer would tend to be fibrillatable or non-fibrillatable. A fibrillatable polymer is one which forms fibers when exposed to a shear force. The known methods, which involve spray drying and coagulation, both expose the solid fluoropolymer particles to shear forces, which can result in the production of an intractable material. The present invention does not involve shear forces at any stage and is therefore suitable for use with a fibrillatable fluoropolymer.

The method of the invention may be used to prepare a modified fluoropolymer powdered material from a pumpable or non-pumpable suspension of the solid fluoropolymer particles in a liquid carrier. The suspension may be non-pumpable because of high viscosity or shear sensitivity. The method does not involve any steps where the suspension must be pumped. Instead, the suspension may be poured or scooped into the tray for freezing, and the solid, frozen block may be transferred into the vacuum chamber.

Figure 2:
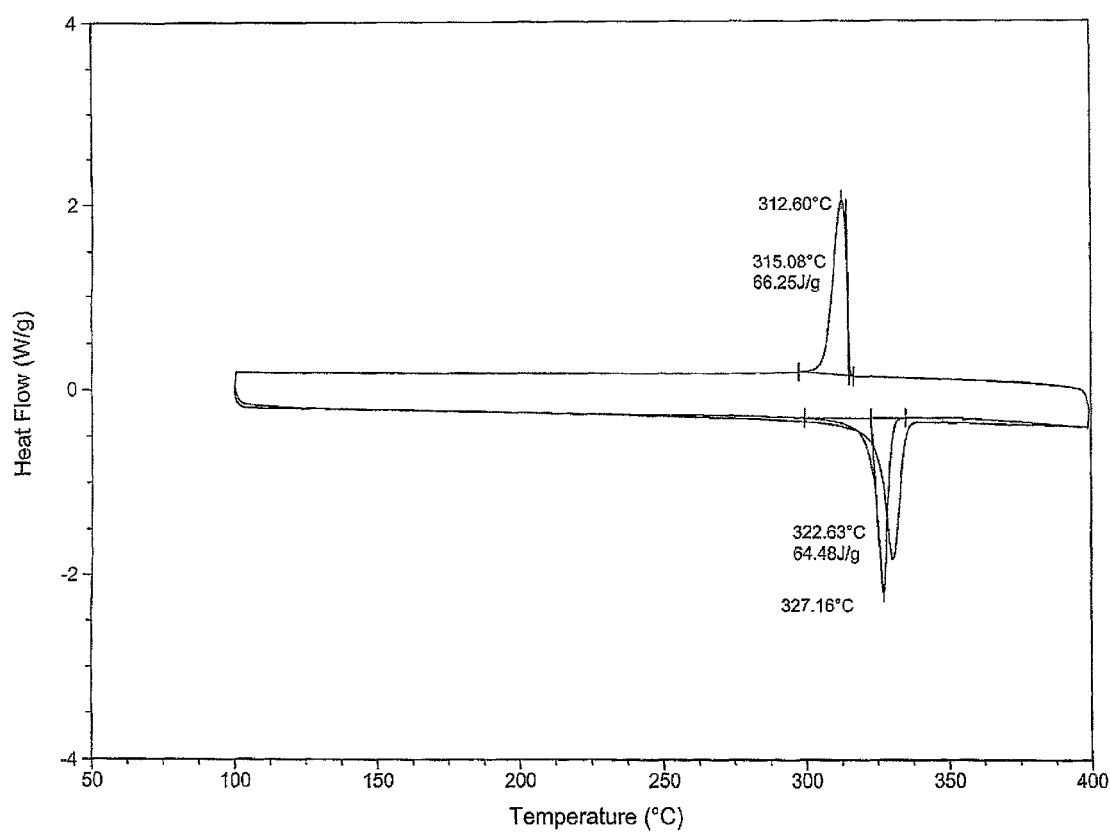
Figure 3:
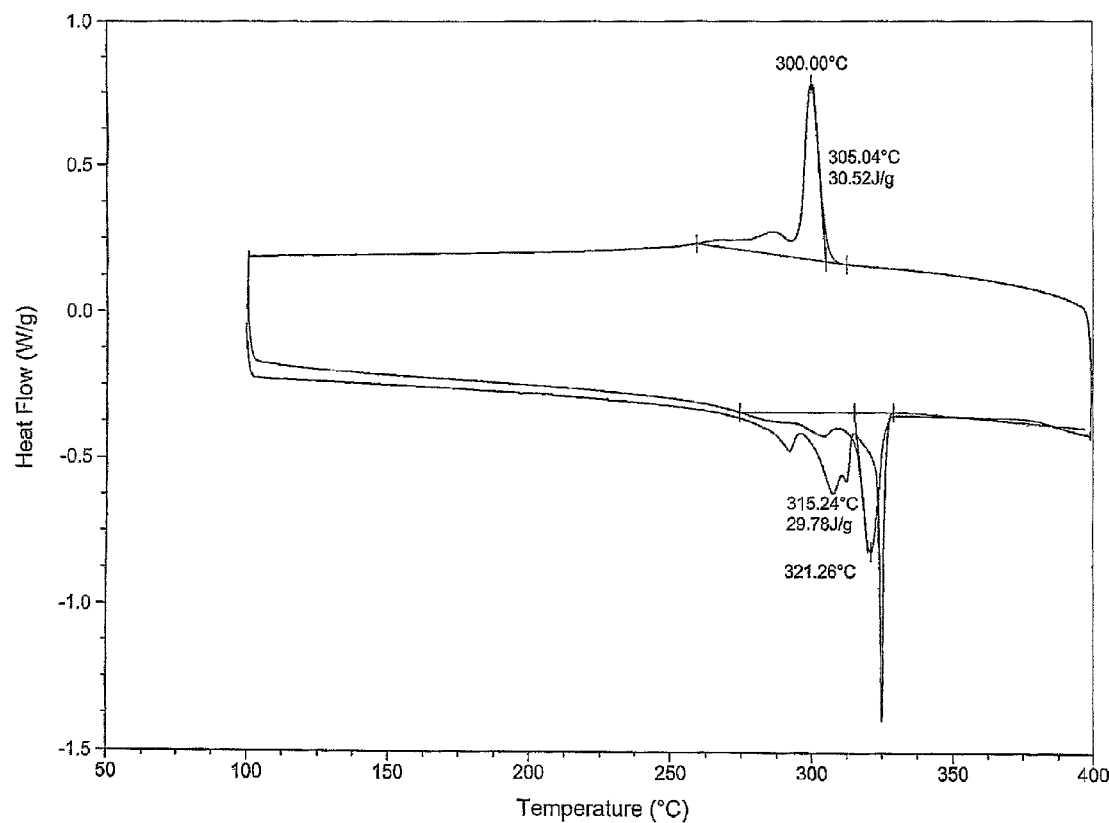

The invention may be carried into practice in varying ways and some embodiments will now be described in the following Example and with reference to the accompanying drawings, in which:

FIG. 1 is a DSC curve for MFA;
FIG. 2 is a DSC curve for PTFE; and
FIG. 3 is a DSC curve for MFA modified by PTFE in accordance with the invention.

EXAMPLE 1

Experiment with PTFE as modifier with MFA.

An SFN-DN PTFE aqueous dispersion stabilised with 0.6% D6483 (100% polysiloxane) on PTFE solids was added to MFA 6202-1 MFA dispersion to give 25:75 PTFE:MFA solids content. The dispersions were mixed with slow stirring. The mixture was frozen and freeze-dried. The resulting dry powder was applied by electrostatic spray gun over a Xylan 4018/G0916 primer on to a grit blasted aluminum panel. The panel was flashed off at 150° C. and cured at 400° C. for 20 minutes. The powder melted to form a continuous film.

Reference is now made to three DSC data sets in FIGS. 1 to 3. A comparison of the melting point shift from pure polymers (FIG. 1—MFA and FIG. 2—PTFE) to the alloy (25 PTFE, 75 MFA), show that the polymers form a true alloy and co-crystallize together. The heat of the crystallization of MFA is 21 J/g while for the alloy if is 30 J/g, which indicates the % crystalline increases by 30%. A similar phenomenon is also found in the heat of melting ($2^{nd}$ melting curve).

The MFA/PTFE blend produced by this process has certain advantages. Increasing the crystalline nature of the MFA polymer can be demonstrated by considering the heat of fusion in the DSC data. The high crystalline polymer has better barrier properties. Also, the spray-drying process yields a homogenous blend of PTFE and MFA. Mixing on a nano scale and freeze drying locks polymer particles in place; no macro aggregation of polymers occurs.

The invention claimed is:

1. A method for the preparation of a modified fluoropolymer material in powder form which comprises the steps of:
   forming a suspension of solid particles of the fluoropolymer together with particles of polytetrafluoroethylene (PTFE) as a modifier in an aqueous liquid carrier;
   freezing the aqueous suspension; and
   subsequently subjecting the frozen aqueous suspension to sublimation, thereby producing dry particles of the fluoropolymer, modified by the presence of the PTFE modifier, in powder form.

2. The method of claim 1, wherein the fluoropolymer comprises perfluoromethyl vinyl ether (MFA).

3. The method of claim 1, wherein the particle size of the fluoropolymer is in the range 30 to 350 nm.

4. The method of claim 1, wherein the PTFE modifier has a particle size in the range 30 to 350 nm.

5. The method of claim 1, wherein the PTFE is present as up to 50 wt % of the MFA/PTFE mixture, expressed on a dry weight basis.

6. The method of claim 1, wherein sublimation is achieved by means of a sub-atmospheric pressure.

7. The method of claim 6, wherein the reduced pressure is in the range of 0.01 to 0.99 atm.

8. The method of claim 1, wherein sublimation is carried out at a temperature below the glass transition temperature of the fluoropolymer.

9. The method of claim 8, wherein sublimation is carried out at ambient temperature.

10. The method of claim 8, wherein sublimation is carried out at a temperature between ambient temperature and the glass transition temperature of the fluoropolymer.

11. The method of claim 1, wherein the suspension of the solid particles in the aqueous carrier is frozen at a temperature in the range −60° C. to −20° C.

12. The method of claim 1, wherein the suspension of the solid particles in the aqueous carrier is frozen in trays.

13. The method of claim 1, wherein the modified fluoropolymer particles are subjected to milling.

14. The method of claim 1, wherein the modified fluoropolymer particles are subjected to irradiation.

15. The method of claim 1, wherein the fluoropolymer is fibrillatable.

16. The method of claim 1, wherein the fluoropolymer is non-pumpable.

17. The method of claim 1, wherein the fluoropolymer is perfluoro alkoxy (PFA).

18. The method of claim 1, wherein the fluoropolymer is fluoro ethylene propylene (FEP).

19. The method of claim 1, further comprising the additional step of spraying the powder onto a substrate.

* * * * *